United States Patent [19]

Giandenoto et al.

[11] Patent Number: 4,724,662

[45] Date of Patent: Feb. 16, 1988

[54] LAWN THATCHER ASSEMBLY

[75] Inventors: Frank J. Giandenoto, Matthews, N.C.; Marvin L. Joray, Union Grove, Wis.

[73] Assignee: Textron Inc., Providence, R.I.

[21] Appl. No.: 887,198

[22] Filed: Jul. 21, 1986

[51] Int. Cl.⁴ .................... A01D 34/52; A01B 45/00
[52] U.S. Cl. ........................... 56/256; 172/21; 241/295; 241/243
[58] Field of Search ............ 172/548, 549, 550, 21; 241/243, 295; 56/256

[56] References Cited

U.S. PATENT DOCUMENTS

| | | | |
|---|---|---|---|
| 307,913 | 11/1884 | Chandler | 241/295 |
| 949,218 | 2/1910 | Christoffersen | |
| 1,178,515 | 4/1916 | Haldin | 172/549 |
| 1,742,563 | 1/1930 | Stidger | 172/21 |
| 2,149,193 | 2/1939 | Stock | 146/121 |
| 2,197,549 | 4/1940 | Hargrave et al. | 262/20 |
| 2,244,099 | 6/1941 | Chase | |
| 2,551,049 | 5/1951 | Pinkers | 146/121 |
| 2,604,026 | 7/1952 | Latta | 97/212 |
| 2,781,563 | 2/1957 | Horth | 22/89 |
| 2,827,751 | 3/1958 | Mascaro | |
| 2,881,847 | 4/1959 | Strasel | 172/549 |
| 3,102,376 | 9/1963 | Henderson | 172/15 |
| 3,330,365 | 7/1967 | Mathers | 172/548 |
| 3,439,747 | 4/1969 | Kindlien | 172/21 |
| 3,452,823 | 7/1969 | Shapland | 172/548 X |
| 4,494,365 | 1/1985 | Lloyd | 56/256 |

Primary Examiner—Richard J. Johnson
Attorney, Agent, or Firm—Arthur J. Hansmann

[57] ABSTRACT

A lawn thatcher assembly including a shaft and a plurality of blades and spacers extending therealong. The shaft has a helical surface thereon, and the blades have a matching helical opening, all of which permits the blades to be slid onto the shaft and present a final helical pattern of blade tips along the length of the shaft. The method of making the assembly is also achieved in this invention.

10 Claims, 8 Drawing Figures

U.S. Patent  Feb. 16, 1988  4,724,662
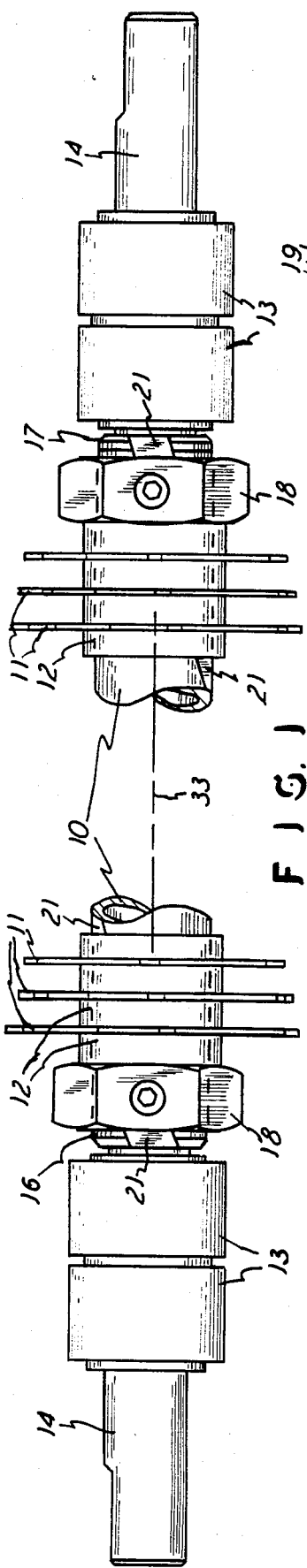
FIG. 1
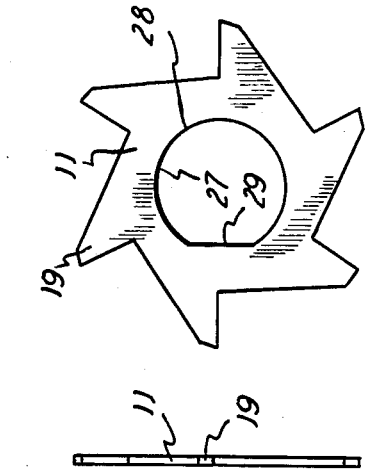
FIG. 2
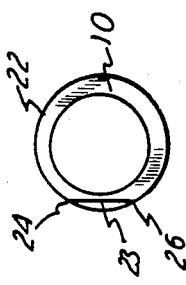
FIG. 4
FIG. 5  FIG. 6
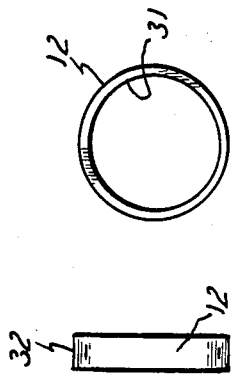
FIG. 7  FIG. 8
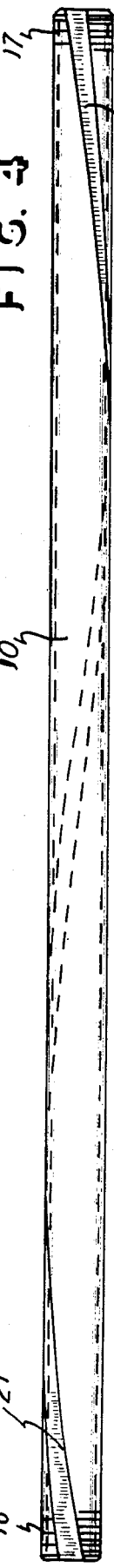
FIG. 3

LAWN THATCHER ASSEMBLY

This invention relates to a lawn thatcher assembly, and, more particularly, it relates to the thatcher assembly of a shaft and blades, forming a helical pattern therealong, and the method of arranging for the helical pattern.

BACKGROUND OF THE INVENTION

The lawn care industry provides thatcher products which slice or rake the upper layer of the turf of grass or the like to condition the turf, such as shown and described in U.S. Pat. Nos. 2,827,751 and 2,881,847 and 4,494,365. Those three patents show assemblies of shafts and turf slicing blades, with the assembly normally being mounted forwardly on a mower or like machine for moving over the ground surface in the thatching or slicing process. Further, adjacent ones of those blades of the prior art are normally offset from each other in an end or axial view of the assembly, and the blades are also drivingly related to the mounting shaft which is rotatable. Those patents show specific ways in which the blades are related or mounted on the shaft, and other specific showings are in U.S. Pat. Nos. 949,218 and 2,149,193 and 2,244,099 and 2,551,049 and 2,781,563.

All of the aforementioned patents are distinguishable from the present invention of the appratus and method in that those patents show specific and imited arrangements for mounting the blades on the shaft. That is, the present invention provides apparatus and method for mounting the blades on the shaft in an automatic manner wherein the blades present a helical pattern along the length of the shaft, though no careful or special or specific maneuvering or positioning of the blades by the assembler is required in order to achieve the desired helical pattern.

U.S. Pat. Nos. 2,197,549 and 2,604,026 and 3,330,365 also show cutter members on a rotatable shaft or the like and with the cutting members being disposed in a helical pattern therealong. However, these patents are also similarly limited in that they require careful and specific positioning of the blades in order to achieve the helical patterns or they require that the assembly be carefully manufactured to close tolerances in order to achieve the assembly and to achieve the necessary driving torque between the shaft and the blades, such as revealed in the limitations of U.S. Pat. No. 3,330,365. In that patent, the support arbor or shaft has a plurality of keys extending therealong in helical patterns, and the blades slide over the arbor in mating relationship with the keys, for presenting the helical blade pattern. That patent discloses four splines or keys on the outer circumference of the arbor, and, where those keys might be welded, there is a problem of clearance for sliding the cutters or rings thereover. In any event, there is only minimal drive relationship for transmitting torque between the keys and the blades, and, in the assembly, the assembler must fit each of the blade key-ways onto the keys.

The present invention improves upon the prior art in the manner aforementioned, and it also does this in providing an assembly which is easily accomplished with a minimum of skill, attention, and time, so that one can readily and accurately assemble the blades and spacers onto the shaft to provide the desired helical pattern in an automatic fashion. The invention also results in minimal expense, as well as labor saving and ultimate accuracy and strength of the final assembly. Still further, the degree of helix provided with these cutting blades is such that the blades are not subject to clogging from the turf encountered thereby, and also they do a minimum of damage to the turf because of the degree of offset between adjacent blades, as related to the curvature of the helix itself. This therefore results in an improved method of assembling or attaching, indexing, and driving the blades by the rotating shaft, all in an accurate and sturdy relationship. As such, the blades of this invention can be made with less detail and attention than that required of blades heretofore provided, and the present blades can be a more desirable heat-treated steel blade.

BRIEF DESCRIPTION OF THE DRAWING

FIG. 1 is a front elevational view of the lawn thatcher of this invention, in its opposite end portions.

FIG. 2 is a right side elevational view of FIG. 1.

FIG. 3 is a front elevational view of the shaft shown in FIG. 1, on a reduced scale.

FIG. 4 is an end elevational view of the shaft of FIG. 3.

FIGS. 5 and 6 are face and edge views, respectively, of the thatcher blade of this invention.

FIGS. 7 and 8 are end and side views, respectively, of the spacer shown in the assembly in FIG. 1.

DETAILED DESCRIPTION OF THE PREFERRED EMBODIMENT AND METHOD

The lawn thatcher assembly of this invention is mountable on a lawn mower or the like for the turf thatching or slicing work mentioned. The assembly can be utilized on the front of a lawn mower, such as shown in U.S. Pat. No. 4,494,365, and also in U.S. Pat. No. 2,881,847 where they both show a thatcher or conditioner assembly forward of a powered unit, such as a lawn mower.

The assembly shown in FIG. 1 generally consists of a cylindrical shaft 10 and a plurality of thatcher blades 11 and a plurality of spacers 12. The blades 11 and spacers 12 are spaced along the length of the shaft 10 which is shown in its two opposite ends in FIG. 1 but which would be generally of a length to correspond with the width of a lawn mower on which the shaft 10 would be rotatably mounted in a forward position. Thus, two end bearing assemblies 13 are supportive of the shaft 10 so that the shaft is of course rotatably mounted, and the bearings 13 have a shaft end 14 extending therefrom and which is drivingly related, and the inner ends of the two shafts 14 are pressed into the opposite ends of the shaft 10, to complete the drive relationship. The shaft 10 terminates in its ends 16 and 17, and those ends are threaded, and a nut 18 is threadedly mounted on each end 16 and 17 and moves inwardly along the shaft 10 to force the assembly of the blades 11 and spacers 12 together and hold them from movement axially of the shaft 10, in the final assembly.

FIG. 2 shows that the blades 11 have cutting tips 19 extending radially thereon, and those tips are six in number on each one of the blades 11, and of course the tips are very narrow in the view in FIG. 2 and extend for only three degrees or so on their circumferential path. FIG. 2 also shows that the blades 11 form a helical pattern along the lengths of the shaft 10, since each blade tip 19 is slightly offset in that end view.

FIGS. 3 and 4 show the configuration of the shaft 10, and it will be seen that the shaft is cylindrical and of course elongated and is of a hollow tube formation. A flat surface 21 is formed along the entire length of the shaft 10 in a helical pattern to present one full turn of the helix along the one full length of the shaft 10, as shown. Thus, FIG. 4 shows that the configuration of the shaft 10 consists of an incomplete circle designated 22 and a straight or chord line 23 connecting the circle free ends 24 and 26. That is, the cross-section along the shaft at any place thereon presents the view shown in FIG. 4 which is in the nature of a circle with a portion thereof being flat, as at 23. The circular portion 22 extends for approximately 300 degrees of the circle, and the flat portion 23 then subtends the remaining approximately 60 degree of an otherwise complete circle.

FIGS. 5 and 6 show the blade 11 in full view characteristics mentioned previously. Further, FIG. 5 shows that the blade has a central opening 27 which has a configuration identical to that shown of the shaft 10 in its end view in FIG. 4. Therefore, the blade 11 has the incomplete circular portion 28 and the flat or straight line portion 29. Of course the blade opening 27 is only very slightly larger than the shaft configuration shown in FIG. 4, all so that the blades 11 can slide over and along the shaft 10 and be very snug therewith for a rotational driving relationship between the shaft 10 and the blades 11.

Further, the blades 11 are of flat stock material, such as shown in FIG. 6, and they are therefore readily made and easily heat treated, and the formation can be inexpensively and accurately provided for the blades 11, including the provision for the tips 19 and the central opening 27 in each blade.

FIGS. 7 and 8 show the spacers 12, and here it will be seen and understood that the spacers have central openings 31 which are substantially the same size as the outer circumference of the shaft 10, being only slightly larger to readily slide over the shaft in the assembly process. Thus, as seen in FIGS. 1 and 8, the spacers 12 have a significant length designated 32, and that length provides for the required spacing between the blade tips 19 to effect the offset between the tips 19 as seen in FIG. 2. Therefore, the radial extent of the tips 19 from the center of the blade 11, as well as the spacer length 32, all determine the helical pattern for the tips 19 and the offset between adjacent tips 19, as mentioned, and of course that is also determined by the amount of curvature or helical angle for the flat surface 21. That is, these several relationships come together to provide the desired helical pattern for the blade tips 19 so that optimum turf slicing, without blade clogging, is accomplished.

In assembling the apparatus, it should therefore be apparent that one would initially thread a nut 18 onto the shaft 10 and then slide a spacer 12 over the shaft and then slide a blade 11 onto and over the shaft. Of course the spacer 12 will not take any particular angulation relative to the longitudinal axis of the shaft 10, that being the axis designated 33 in FIG. 1, however, the blades 11 will take the desired angulation relative to the shaft 10, all by virtue of the snug fit and close mating between the blade openings 27 and the exterior or circumference of the shaft 10. Of course, the complete assembly of spacers 12 and blades 11 will result in the desired helical pattern of the blade tips 19 along the axial length of the shaft 10. FIG. 2 shows that the assembly can therefore rotate in the direction of the arrow A to present the tips 19 to the turf when the assembly is mounted on a reel-type lawn mower and powered thereby.

In that arrangement, it will be seen and understood that the helical surface 21 extends throughout the length of the shaft 10 and is at a radius less than the radius of the shaft outer circumference 22. Further, with the relationship mentioned, the amount of offset between the cutting tips is between three and four angular degrees, and there are therefore, at least several score of the blades 11 along the entire shaft 10 for the desired thatching relationship with a minimum of upset to the turf. Again, to achieve this, the spacers 12 are at least three times in their length 32 compared to the thickness of the blade, as seen in FIG. 6, in conjunction with the angle of the helix of the flat surface 21.

With the foregoing description, the method of making the assembly will be readily apparent to one skilled in the art. Of course the flat surface 21 can be milled on the tubular or cylindrical shaft 10, and the assembly of the blades 11 and spacers 12 can then be readily made by sliding them over the end of the shaft 10 and securing the assembly by the threaded nuts 18.

What is claimed is:

1. A lawn thatcher assembly for use on a powered reel-type lawn mower, comprising a rotatably mounted blade-mounting cylindrical hollow shaft, at least several score of radially extending thatcher blades with each one of said blades being of a flat plate-type thickness completely disposed in only one plane and mounted on said shaft and with each of said blades having a plurality of radially extending turf-cutting tips, a plurality of spacers on said shaft and with one of said spacers between every two of said blades, said shaft having only one flat surface extending helically throughout the exterior length of said shaft at a radial distance from the longitudinal axis of said shaft less than the radius of the outer circumference of said shaft, and greater than the distance of the inner circumference of said shaft, such that a cross-section of said shaft is the shape of an incomplete circle with a straight line forming a chord between the ends of the incomplete circle and with said chord thereby defining said flat surface, each of said blades having a central opening extending therethrough in the shape of said cross-section and thereby including a blade flat in said central opening which is of a shape for snug mounting on said shaft by sliding over said shaft from an end thereof and thereby have the plurality of said blades with said turf-cutting tips disposed in a helical pattern along the length of said shaft, said tips of each of said blades being in specific circumferential positions relative to said blade flat.

2. A lawn thatcher assembly for use on a powered reel-type lawn mower as claimed in claim 1, wherein the helical curvature of said flat which extends along said shaft and the length of each of said spacers along said shaft are both of configurations whereby every two adjacent ones of said tips are offset from each other by at least three degrees when viewed along a sighting parallel to said longitudinal axis of said shaft.

3. A lawn thatcher assembly for use on a powered reel-type lawn mower as claimed in claim 2, wherein each of said blades has six said tips which thereby present six helical patterns along the assembly.

4. The lawn thatcher assembly for use on a powered reel-type lawn mower as claimed in claim 1, wherein the helical curvature of said flat is configured to have said flat wind along said shaft in only one complete circumferential disposition along the entire length of said shaft.

5. The lawn thatcher assembly for use on a powered reel-type lawn mower as claimed in claim 1, wherein said shaft has external threads on each end thereof, and a nut on said threads for pressing said blades and spacers together.

6. The lawn thatcher assembly for use on a powered reel-type lawn mower as claimed in claim 1, wherein said blades and said spacers are separate parts of the assembly, and said spacers are cylindrical and each have a fully circular central opening therethrough of a diameter to have said spacers snugly mounted on said shaft, and said spacers each having a length along said shaft at least three times the thickness of said blades as extending along said shaft, to thereby space said blades apart a distance sufficient to present helical patterns with said blades and thereby avoid clogging with debris.

7. A method of arranging a helical pattern of thatcher blades on a shaft, comprising the steps of forming only one complete turn of a helical flat surface along the full length of a cylindrical shaft to present a cross-section at all locations along said shaft of a profile configuration of an incomplete circle and a straight line extending between the ends of said incomplete circle, forming a plurality of thatcher blades with central openings of the identical shape of said configuration and at least as large, forming a plurality of spacers with central openings of at least the circumference of said incomplete circle, and alternately sliding at least several score of said blades and said spacers onto said shaft for forming the helical pattern of said blades along said shaft.

8. A lawn thatcher assembly for use in grooming a lawn by slicing into the turf, comprising a rotatably mountable blade-mounting cylindrical shaft, at least several score of radially extending blades and spacers mounted on said shaft, said shaft having only one flat surface extending helically throughout the length of said shaft at a radial distance from the longitudinal axis of said shaft less than the radius of the outer circumference of said shaft such that a cross-section of said shaft perpendicular to the longitudinal axis thereof is the shape of an incomplete circle with a straight line forming a chord between the ends of the incomplete circle and with said chord thereby defining said flat surface, each of said blades of a flat plate-type thickness completely disposed in only one radial plane which is confined to said thickness and with each of said blades having a plurality of radially extending turf-cutting tips disposed completely in said plane for rotation only in said plane, each of said blades having central opening extending therethrough in the shape of said cross-section and thereby including a blade flat in said central opening which is of a shape for snug mounting on said shaft from an end thereof and thereby have the plurality of said blades with said turf-cutting tips disposed in a helical pattern along the length of said shaft, said tips of each of said blades being of a sufficient length along the circular path of rotation thereof, and being in specific circumferential positions relative to said blade flat, such that every two adjacent ones of said tips overlap each other in a view of said assembly parallel to the longitudinal axis of said shaft, for simultaneous penetration of the turf by adjacent ones of said tips.

9. A lawn thatcher assembly for use on a powered reel-type lawn mower as claimed in claim 8, wherein the helical curvature of said flat which extends along said shaft and the length of each of said spacers along said shaft are both of configurations whereby every two adjacent ones of said tips are offset from each other by approximately only three degrees when viewed along a sighting parallel to said longitudinal axis of said shaft.

10. A lawn thatcher assembly for use on a powered reel-type lawn mower as claimed in claim 9, wherein each of said blades has six said tips which thereby present six helical patterns along the assembly.

* * * * *